United States Patent
Braunecker et al.

(10) Patent No.: US 8,462,979 B2
(45) Date of Patent: Jun. 11, 2013

(54) OPTOELECTRONIC ANGLE SENSOR AND METHOD FOR DETERMINING A ROTATIONAL ANGLE ABOUT AN AXIS

(75) Inventors: Bernhard Braunecker, Rebstein (CH); Peter Kipfer, Marbach (CH); Heinz Lippuner, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 516 days.

(21) Appl. No.: 12/377,445

(22) PCT Filed: Aug. 16, 2007

(86) PCT No.: PCT/EP2007/007248
§ 371 (c)(1),
(2), (4) Date: Nov. 12, 2010

(87) PCT Pub. No.: WO2008/019855
PCT Pub. Date: Feb. 21, 2008

(65) Prior Publication Data
US 2011/0044561 A1 Feb. 24, 2011

(30) Foreign Application Priority Data
Aug. 18, 2006 (EP) .................................... 06119146

(51) Int. Cl.
*G06K 9/00* (2006.01)
(52) U.S. Cl.
USPC .......................................................... 382/100
(58) Field of Classification Search
USPC .......................................................... 382/100
See application file for complete search history.

(56) References Cited

U.S. PATENT DOCUMENTS

| | | | | |
|---|---|---|---|---|
| 3,862,428 A | * | 1/1975 | Waters | 250/570 |
| 3,865,428 A | | 2/1975 | Chester | |
| 4,318,225 A | * | 3/1982 | Jenkinson | 33/1 PT |
| 4,953,933 A | * | 9/1990 | Asmar | 385/124 |
| 6,185,343 B1 | * | 2/2001 | Ikeda et al. | 382/291 |
| 6,552,330 B2 | * | 4/2003 | Blasing | 250/231.13 |
| 7,078,677 B2 | * | 7/2006 | Chong et al. | 250/231.18 |

(Continued)

FOREIGN PATENT DOCUMENTS

| | | | |
|---|---|---|---|
| DE | 3924460 A1 | * | 2/1990 |
| DE | 19750474 A1 | * | 6/1999 |

(Continued)

OTHER PUBLICATIONS

JPO Office Action issued on Aug. 23, 2011 in Japanese Patent Application No. 2009-524127.

(Continued)

*Primary Examiner* — Jayesh A Patel
(74) *Attorney, Agent, or Firm* — Maschoff Brennan

(57) ABSTRACT

The invention relates to an optoelectronic angle sensor ($1a$) for determining a rotational angle about an axis (6), comprising a circular disk ($2a$) that can be rotated about the axis. Said circular disk comprises a coding, essentially over the entire surface, a flat photosensitive detector ($3a$), a device for producing an evaluable image of the coding on the detector and a memory and evaluation component ($4a$) for determining the rotational angle. A largely complete, or in particular an entire image of the coding is produced on the detector. The rotational angle is determined using a parameter-varying stochastic comparison method, from the image and a parameterised electronic reference pattern that is provided by means of the memory and evaluation component.

20 Claims, 6 Drawing Sheets

U.S. PATENT DOCUMENTS

| | | | |
|---|---|---|---|
| 7,145,127 B2 * | 12/2006 | Chin et al. | 250/231.13 |
| 7,589,313 B2 * | 9/2009 | Nordenfelt et al. | 250/231.13 |
| 7,830,500 B2 * | 11/2010 | Aebischer et al. | 356/138 |
| 2002/0018220 A1 * | 2/2002 | Aoki | 356/614 |
| 2003/0052262 A1 * | 3/2003 | Blasing et al. | 250/231.14 |
| 2005/0072912 A1 * | 4/2005 | Mizuno et al. | 250/231.14 |
| 2008/0291434 A1 * | 11/2008 | Aebischer et al. | 356/138 |

FOREIGN PATENT DOCUMENTS

| | | |
|---|---|---|
| EP | 0 854 436 A2 | 7/1998 |
| EP | 1 722 200 A1 | 11/2006 |
| EP | 1722200 A1 * | 11/2006 |
| EP | 1 790 953 A1 | 5/2007 |
| JP | 58-047212 A | 3/1983 |
| JP | 58047212 A * | 3/1983 |
| JP | 59-031017 U | 2/1984 |
| JP | 01-097869 | 4/1989 |
| JP | 08-193845 | 7/1996 |
| JP | 10-206134 A | 8/1998 |
| JP | 10-253393 | 9/1998 |
| JP | 2004-347382 | 12/2004 |
| WO | WO2004094957 * | 11/2004 |
| WO | WO 2007051575 A1 * | 5/2007 |

OTHER PUBLICATIONS

JPO Office Action issued on Aug. 24, 2011 in Japanese Patent Application No. 2009-524133.

* cited by examiner

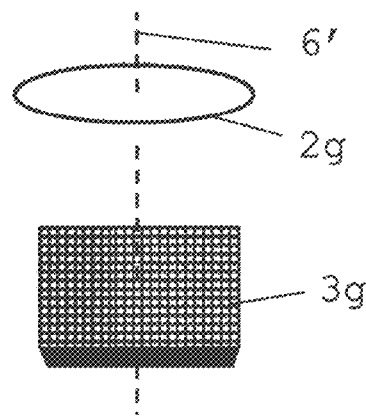 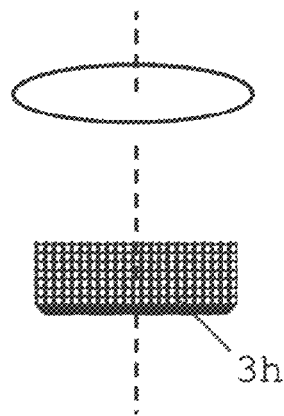 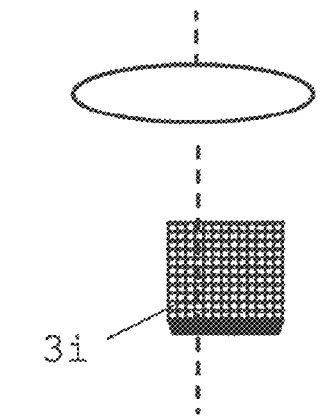
*Figure 5A*  *Figure 5B*  *Figure 5C*
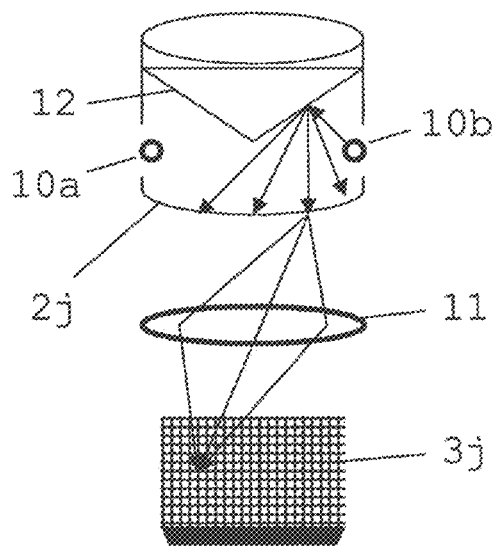 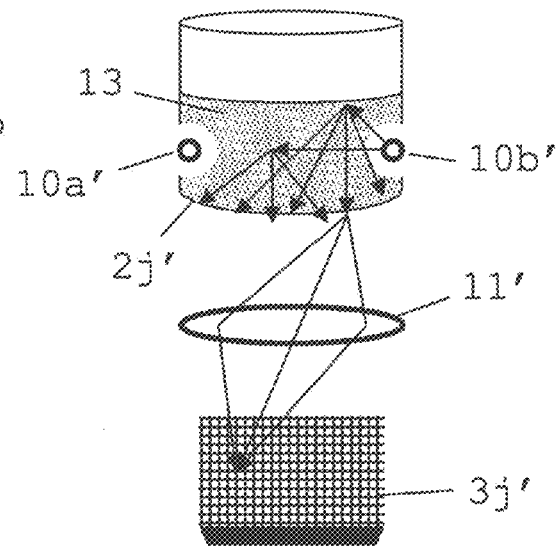
*Figure 6A*  *Figure 6B*

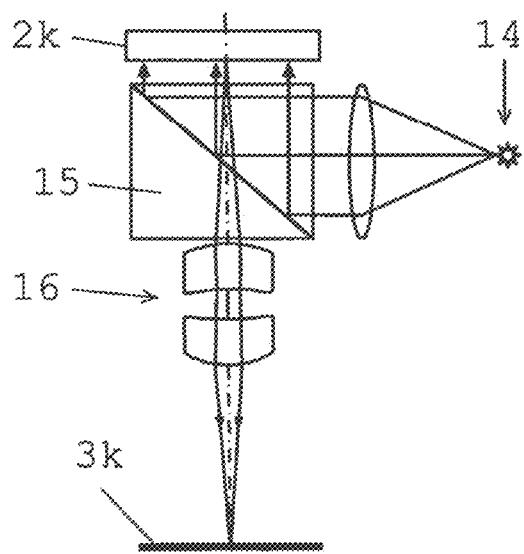
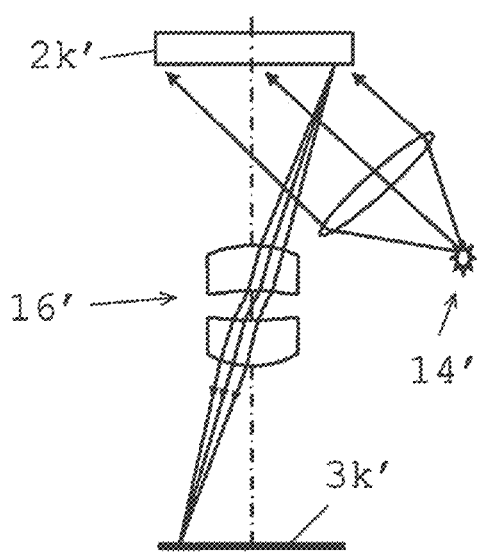
*Figure 6C*  *Figure 6D*

OPTOELECTRONIC ANGLE SENSOR AND METHOD FOR DETERMINING A ROTATIONAL ANGLE ABOUT AN AXIS

The invention relates to an optoelectronic angle sensor and a method for determining a rotational angle about an axis.

As in many other areas, increasingly compact designs are also being strived for in the area of optoelectronic angle sensors. Customary optoelectronic angle sensors for determining a rotational angle about an axis have a code carrier and an optical detector which are rotatable relative to one another. The optical detector is, for example, a photodetector, a CCD line array or a CCD area array. The code carrier is generally in the form of a circular disc or of a circular ring and carries along its circumference an optically detectable position code, a section of which is reproduced on the detector.

In its dimensions, the detector is generally substantially smaller than the code carrier. For miniaturisation of the angle sensor, a reduction in the size of the code carrier is therefore primarily necessary. With a code carrier having a reduced diameter, the ratio of detector area to code carrier area can be increased and thus a larger region of the code applied to the code carrier can be detected. In addition, a higher operation stability is achievable for an angle sensor with the code carrier as a rotating component and the detector as a stationary component since the centrifugal forces acting on the code carrier decrease. In general, the code carrier of the angle sensor rotates. However, it is also possible to design the code carrier to be stationary and the detector to rotate.

In the miniaturisation of the angle sensor, the problem now arises that a reduction of the code carrier area also requires a reduction in size and/or refinement of the code structures. However, the coding cannot be arbitrarily refined in that, with increasingly fine structures, increasingly great diffraction effects occur and the structures can no longer be resolved with the required accuracy. The angular resolution is determined by the resolution of the coding by means of the detector and therefore depends on the resolving power of the detector. However, this is limited since a reduction in the pixel size is limited by the signal-to-noise ratio. Alternatively, a higher angular resolution is achievable by increasing the diameter of the code carrier, which however is in contradiction to all miniaturisation efforts.

In the prior art, angle sensor designs are reduced in size by reducing optical or mechanical components. However, there is no known solution for miniaturising an angle sensor by reducing its code-carrying area without losing angular resolution and hence accuracy of measurement, or increasing the angle of resolution while keeping the size of the code carrier the same.

DE 197 50 474 A1 describes a reduction in the diameter of an index plate of an angle sensor by using the index plate directly in the axis of the rotating shaft. The diameter of the index plate can thus be reduced by the outer mounting, such as a metal ring, thereof.

However, this mechanical solution permits only the reduction in size of the index plate by the outer mounting and therefore offers only latitude for a reduction in the size of the angle sensor in the region of a few percent. It provides no possibility for reducing the diameter of the code-carrying area of the sensor substantially, for example by 80%, and hence of miniaturising the angle sensor.

It is an object of the invention to provide an optoelectronic angle sensor, by means of which angle sensor an accurate determination of the rotational angle is possible even with a code carrier reduced in diameter.

A further object of the invention is to provide an optoelectronic angle sensor which is improved with respect to the accuracy of the angle determination.

It is likewise an object of the invention to provide an optoelectronic angle sensor which is improved with respect to the utilisation of the area of the code carrier.

A further object is to provide a method for determining a rotational angle which permits the determination of the rotational angle with a code carrier having a reduced diameter.

A further object is to provide a method for determining a rotational angle with improved accuracy.

These objects are achieved or the solutions are further developed by the subjects of claims 1, 10 or of the dependent claims, respectively.

The basis of the invention is that the coding of the circular disc of an optoelectronic angle sensor according to the invention is detected substantially completely as an image, and the detected images—or the detector measuring signals—are interpreted as realisations of a statistical parameter. For evaluating the measuring signals, the parameter value characterising the measuring signals is determined from a constructed distribution of parameter values.

For this purpose, a substantially complete, in particular entire, evaluable image of the coding of the circular disc is produced on the detector of the angle sensor by means of a device of the angle sensor. For example, 90% of the coding are detected as an image. The image comprises information about the relative position of circular disc and detector, which can be moved relative to one another. The relative movement comprises at least a relative rotational movement about an axis. In addition, circular disc and detector can also execute—extremely small—translational relative movements and/or tumbling movements, which result, for example, from inaccuracies of assembly and/or of manufacture.

In this context, evaluable image is to be understood as meaning an image from which information about the relative position can be determined. The image need not necessarily be a sharp image of the coding. In the description of the invention, the terms map, projection, measuring signals or measuring pattern are also used for the evaluable image.

The coding of the circular disc of an angle sensor according to the invention is performed in such a way that substantially the total area of the disc is utilised. This is realised by providing the substantially total area region of the disc with code. In particular, the coding applied to the circular disc has a code which extends both in the azimuthal and in the radial direction and changes in an angle-dependent manner in both directions. For example, a customary code which is applied to a customary circular disc in the outer region of the circular disc along the circumference thereof and changes in an angle-dependent manner in the circumferential direction is applied both in the circumferential direction and transversely thereto to the circular disc of the angle sensor according to the invention, for example in a meandering manner—the code is, so to speak, "folded" onto the disc. In contrast to the customary code, the code therefore carries angle-dependent code information additionally in the radial direction.

The information content of the coding is determined by the number of transitions—also referred to as "jumpiness" of the code. The transitions are produced by the changes in the properties of the code elements, such as light transmittance/light opacity or reflection/absorption. Owing to the application of the coding substantially over the whole area and hence utilisation of substantially the total area of the circular disc, a maximised number of transitions is obtained.

The circular disc coded in such a manner corresponds, so to speak, to a "coded axis". On the basis of this coding, a large number of transitions for generically accurate angle determination can also be applied to a circular disc reduced in diameter. With a spatially compacted application of the coding, the diameter of the circular disc can be reduced substantially, for example by more than 90%, compared with customary glass or plastic circular discs used in theodolites and having a diameter of about 78 mm. For example, the circular disc can be implemented as a "minidisc" having a diameter between 6 mm and 10 mm. Such a reduction in the size of the circular disc permits a large reduction of the dimensions of the angle sensor as a whole and hence realisation of a miniaturised angle sensor.

If the circular disc or the angle sensor is not reduced in size, an angle sensor for angle determination with improved accuracy can be realised with a corresponding formation of the circular disc.

In a further development of the invention, the coding of the circular disc comprises a plurality of part-codes. The above-mentioned, azimuthally and radially extending code can form, for example, a part-code. In addition, a part-code can be provided as an absolute code which is applied along the circumference, for example in the outer region of the circular disc, and the detection of which gives a rough value of the rotational angle which permits an improvement of the rotational angle determination with respect to the speed of the evaluation algorithm.

A further part-code can be formed as an additional code for detecting translational movements of the circular disc, for example as an azimuthally extending radial code, such as in the form of concentric circles around the midpoint of the circular disc, i.e. in the inner region thereof. By reading out individual detector lines in the azimuthal and radial direction, a rapid absolute determination of axial tumbling is possible from the image of the radial code. By applying the radial code for translational movements in an inner segment of the circular disc, this inner area, which is not very suitable for the determination of the rotational angle, is also expediently utilised.

In order to produce the image from the coding, a device for mapping or projecting the coding onto the detector of the angle sensor is provided. The device, the circular disc and the detector of the angle sensor according to the invention are formed and arranged in such a way that the coding is mapped substantially completely, in particular entirely, onto the detector. Preferably, an image or measuring pattern is produced which has at least 50%, in particular more than 75% and advantageously 100% of the coding.

The substantially complete detection with a resolution of the coding which is sufficient for evaluation can be realised on the basis of a corresponding illumination concept, a circular disc reduced in size, the formation and arrangement of device, circular disc and detector or on the basis of a combination of the above-mentioned.

For producing the image, the device comprises a radiation source, such as one or more photodiodes for illuminating the circular disc. Depending on the formation of the coding—for example with transparent and opaque code elements or code elements distinguishable by different reflectivity—the image production is effected in transmitted light or reflected light. In the transmitted-light method, the detector receives the transmitted radiation modulated by the code elements; in the reflected-light method, the detector receives the reflected radiation modulated by the code elements.

Illumination of the circular disc or of a circular disc region as homogeneously as possible can be realised by beam divergence by means of an appropriate optical system which can be formed, for example, by a deflecting mirror or a scattering medium. The device is designed in particular for projecting a region of the circular disc which corresponds to the region of the detector elements. If appropriate, the device may also represent a self-illuminating code, for example with organic light emitting diodes.

The circular disc can as mentioned above—advantageously be reduced in size. This permits an—economical—embodiment of an angle sensor according to the invention comprising a detector whose area substantially corresponds to the area of the circular disc. In particular, it is possible to use a detector whose length and width dimensions correspond to the diameter of the circular disc. Such an embodiment in which the code-carrying circular disc and the detector have substantially the same dimensions permits, in a simple manner, the detection of the substantially entire circular disc area or of the applied coding on the detector. In addition, a separation of the centre of the circular disc from the axis of rotation—an eccentricity—can advantageously be established thereby. In an embodiment of the invention, the circular disc and the detector are arranged substantially in coincidence and coaxially centred.

The detector is a planar photosensitive detector formed, for example, by arrangements of CCD line arrays and CCD column arrays. A matrix-like arrangement of photosensitive regions can be realised with a CCD area sensor or CMOS area sensor. Alternative customary sensors can also be used.

The image or the measuring signals of the detector comprises or comprise information about the relative position of circular disc and detector, which information is evaluated by comparison with an electronic reference pattern using a parameter-varying comparison method. On the basis of this evaluation, even very small and fine code structures can still be resolved with high accuracy and the rotational angle accurately determined.

The electronic reference pattern is provided by means of a memory and evaluation component of the angle sensor according to the invention. The memory and evaluation component is furthermore formed for evaluating the detector measuring signals on the basis of the evaluation method mentioned. For this purpose, the memory and evaluation component has a computer program product which contains program code which is adapted so that it executes the method when it runs on the component. For evaluating image information which is present, for example, as electrical digital detector signals, in particular for numerical processing of a large data quantity, such as, for example, the data quantity of a 1000×1000 CMOS pixel sensor, the memory and evaluation component is formed, for example, as a microprocessor. An FPGA (field-programmable gate array) or an ASIC (Application Specific Integrated Circuit) is also suitable as the memory and evaluation component.

The reference pattern can be modelled as a statistical distribution for an unknown characteristic variable of the angle determination or of the detector measuring signals. For example, the reference pattern is an estimation function of the variable. The characteristic variable can be the rotational angle. The unknown variable of the statistical model can be determined by statistical methods, such as estimation methods.

The reference pattern can also be formed by an algorithm which simulates or duplicates the measured pattern or the image or the detector measuring signals and/or the coding. For example, the code structure, the mapping parameters of the device and of the detector and mapping errors are taken into account for as realistic a description as possible of the measured pattern.

In an embodiment of the invention, the maximum likelihood method is used as a stochastic comparison method for evaluating the measured pattern. The method according to the invention then comprises, for example, the following steps:
- production of a measured pattern,
- production of a reference pattern, describing the measured pattern as realistically as possible, as a function of a parameter,
- comparison of the measured pattern with the reference pattern,
- variation of the parameter until the reference pattern shows the maximum or maximum achievable similarity to the measured pattern,
- establishment of the parameter as the best estimator and determination of the rotational angle from the parameter estimation.

The parameter is, for example, a reference rotational angle which describes the rotational angle or the relative rotational position of circular disc and detector. The value for the reference rotational angle which would produce the measured pattern with the greatest probability is determined from the parameter estimation.

In a further embodiment of the invention, the measured pattern is evaluated by means of a mathematical correlation method based on an integral comparison of the measured pattern with the configured electronic reference pattern. The parameter is a correlation factor which is a measure of the agreement between measured pattern and reference pattern. Within the scope of the correlation, the parameter is varied until a specified correlation condition—for example a maximum or minimum correlation value—is achieved.

For example, for forming such a correlation, the measured pattern is considered as the folding of the intensity function c of the image, of the optical unsharpness function b of the shadow and of the electrical signal response d of a detector pixel: $Q=c*b*d$, where * is the folding operator. Since the intensity function c also describes the rotational angle $\alpha$ to be determined, the measured pattern function Q is also a function of the rotational angle $\alpha$ to be determined: $Q=Q(\alpha)$.

The reference pattern is produced as the pattern function, describing the measured pattern, of a reference rotational angle $\alpha'$, which describes the rotational angle: $P=P(\alpha')$. For determining the position information of the measured pattern, the measured signals are compared with the synthetic reference signals, the correlation function $\rho=Q(\Delta) \boxtimes P(\alpha')$, with as a correlation operator, being used as a measure of quality.

On comparison of the signals, the reference rotational angle $\alpha'$ is mathematically varied until $\rho$ reaches a maximum—which describes a maximum agreement of the signals. The reference rotational angle $\alpha'$ at $\rho$=max then gives the best estimated value of the rotational angle $\alpha$ sought. With such a correlation method, high resolution values—for example of pixel/100 are achievable.

For comparison of the measured pattern with the reference pattern, it is also possible to use a Moire-like method. The reference pattern is provided—for example in the form of a theoretical model—as a stationary grating provided with a high frequency differing slightly from the frequency of a high-frequency grating as coding, so that a digital overlap of the gratings leads to the known Moire structures. The position information of the measured pattern is evaluated by an integral comparison of the measured pattern with the reference pattern. For example, radial grating structures, such as a Siemens star, or structures, such as radial Fresnel zone gratings—radial "chirp"—are suitable as grating structures.

Depending on the version of the coding of the circular disc, the method according to the invention can additionally use further position information. If the coding has a part-code in the form of absolute code, a rough absolute value for the rotational angle can be determined from the image of the absolute code, which rough value can be used as a starting value of the comparison method. Furthermore, the method can also weight, in particular radially weight, the image information. Thus, for example, code structures which are applied at the outer edge of the circular disc and can be better evaluated with respect to the information about the relative rotational position of circular disc and detector are more strongly weighted as inner structures, in the method according to the invention for the evaluation of the rotational angle, than code structures located further inwards—towards the axis of rotation.

The angle sensor according to the invention and the method according to the invention are described or explained in more detail below, purely by way of example, with reference to working examples shown schematically in the drawings. Specifically:

FIG. 5 shows arrangements of circular disc and detector in three partial figures;

FIG. 6 shows four partial figures with devices of an optoelectronic angle sensor for producing the image.

Figure 1A:
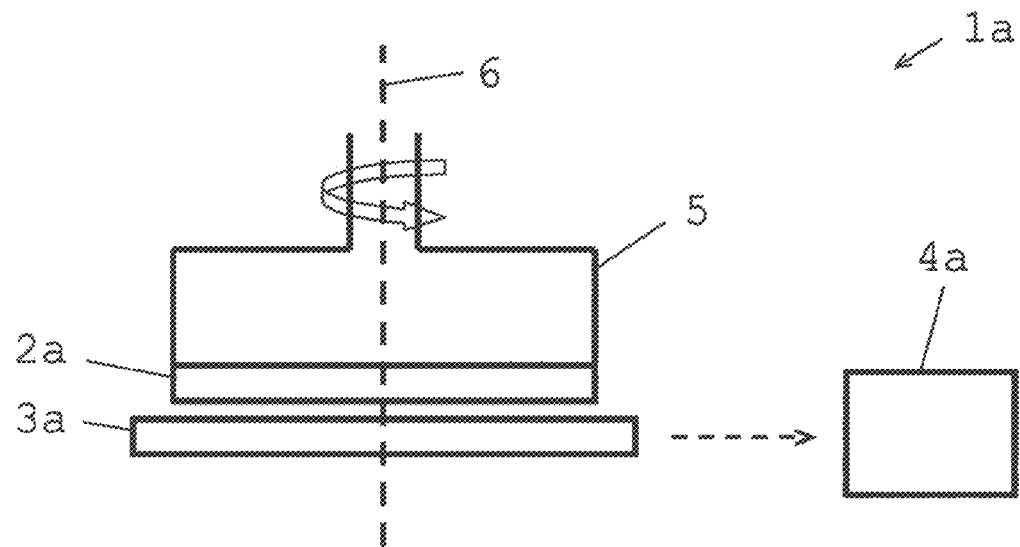
FIG. 1 shows two partial figures with embodiments of an optoelectronic angle sensor.

FIG. 1A shows a setup of an optoelectronic angle sensor 1a for determining a rotational angle about an axis. A circular disc 2a arranged about the axis 6—axis of rotation—as a code carrier is inserted into a mounting 5. For example, the mounting 5 is connected to a tool or a motor. The mounting 5 can also be inserted into the alidade of a theodolite and can rotate with it. The circular disc 2a rotates—as indicated by the arrow—relative to an electro-optical detector 3a which is arranged relative to the circular disc 2a in such a way that code elements applied to that surface of the circular disc 2a which faces the detector 3a are mapped on the detector 3a. Here, circular disc 2a and detector 3a are arranged so as to be coaxially centred. The mapping—or the angle-proportional measured signals—is further processed in an electronics component 4a as memory and evaluation components. According to the invention, an electronic reference pattern whose configuration can be varied by a parameter and which is compared with the measured signals is stored in the electronics component 4a. The rotational angle about the axis 6 is determined by parameter estimation.

Figure 1B:
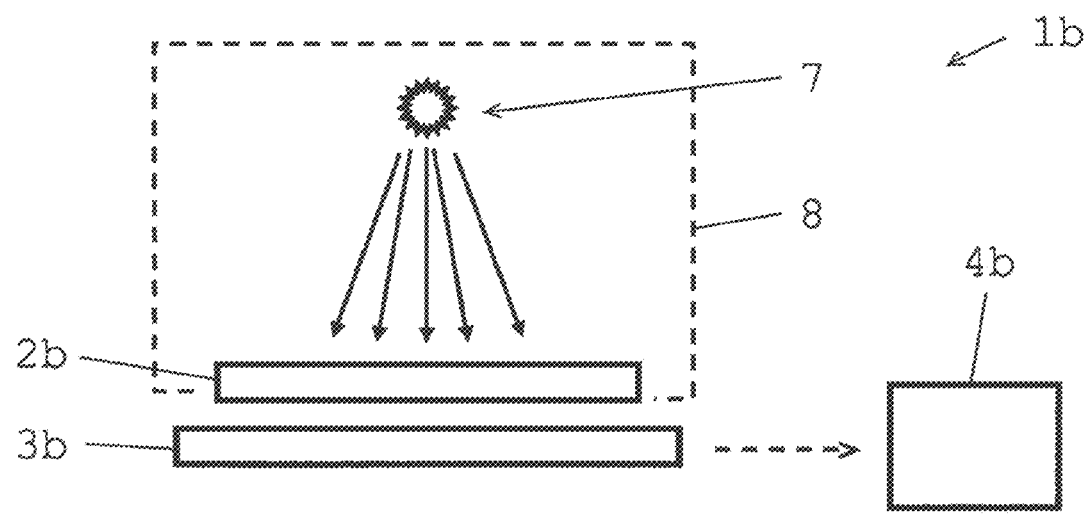

FIG. 1B shows an angle sensor 1b comprising a circular disc 2b rotatable relative to a detector 3b and a radiation source 7 of a mapping device. The detector 3b is dimensioned to be substantially the same size as the circular disc 2b. By means of the optical radiation emitted by the radiation source 7, the coding of the circular disc 2b is completely mapped on the detector 3b. Radiation source 7 and circular disc 2b are arranged in a common housing 8—represented by dashed lines—so that radiation source 7 and circular disc 2b rotate together. The radiation source 7 can also be arranged outside the rotating parts and can be fixed. Alternatively, the detector 3b can be formed and arranged as a rotating component. The circular disc 2b is formed from optically transparent material, such as glass or plastic, and has—not shown—regions transparent and opaque to the radiation, as coding. By means of the radiation incident on the circular disc 2b and partly passing through, an entire image of the coding is produced on the detector 3b. As in FIG. 1A, the mapping is compared with an electronic reference pattern in a memory and evaluation component 4b, e.g. an FPGA (field-programmable gate array), and the rotational angle is determined in the comparison method.

Figure 2A:
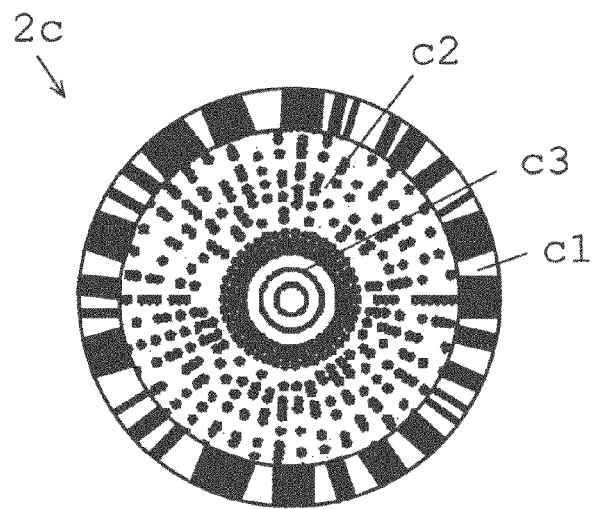
FIG. 2 shows a partial figure with an embodiment of a coded circular disc of an angle sensor and a partial figure for explaining the correlation method.

FIG. 2A shows an embodiment of a circular disc 2c of an optoelectronic angle sensor according to the invention. The circular disc 2c carries a coding over substantially its whole area, which coding here has a first, second and third part-code. The first part-code is an azimuthally extending binary absolute code c1 applied in the outer region of the circular disc 2c. The second part-code is in the form of a point code c2 having a polar distribution. The concentric circles c3 about the centre of the circular disc form the third part-code. Eccentricity errors can be determined by an appropriate detection of the third code. The circular disc 2c shown permits the determination of the rotational angle by means of the following steps: the coding is mapped on the detector so that the first, second and third part-codes are detected substantially completely—e.g. to an extent of 95%. A rough value of the rotational angle can be determined from the image of the absolute code c1. The measured signals representing the image of the point code c2 are compared, by forming a correlation, algorithmically with the idealised data of a mapped model of the point code c2, which model forms the reference pattern. The point code c2 on the circular disc 2c is an ambiguous code, i.e. does not give unambiguous position information. Since the point code c2 is not unambiguous, the correlation of the idealised data with the measured signals gives rise to a plurality of correlation peaks, as shown in the diagram of the correlation of the data as a function of the rotational angle in FIG. 2B. The relevant angular interval and the correct correlation peak p are now selected on the basis of the rough angular value determined from the evaluation of the absolute code c1.

Figure 3C:
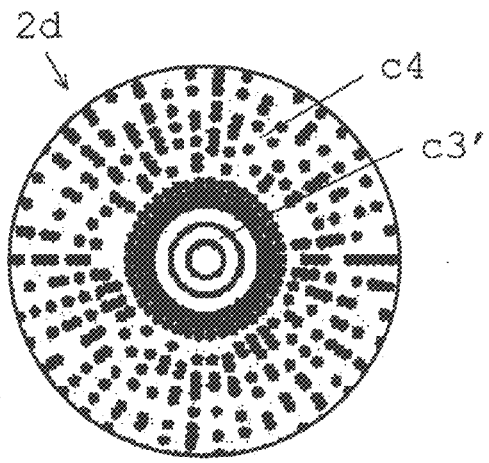
FIG. 3 shows two partial figures with further embodiments of coded circular discs of an angle sensor and a third partial figure for explaining the correlation method.
Figure 3C:
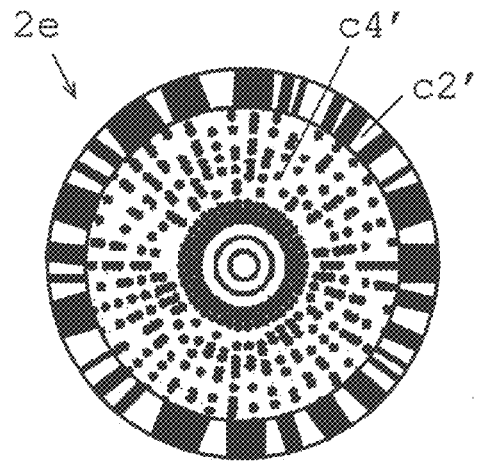
Figure 3C:
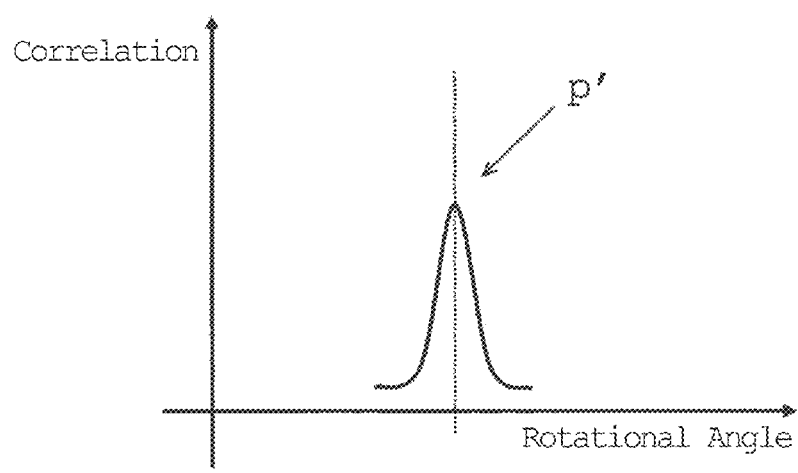

FIG. 3A shows a circular disc 2d having two part codes as coding, the rotational angle being determinable in principle from the image and the evaluation of the point code c4 distributed in a polar manner, as a part-code. The further part-code shown—the azimuthally extending radial code c3'—is provided for eliminating eccentricity and axial tumbling errors. The point code c4 extending in the circumferential and radial directions and distributed in a polar manner carries unambiguous position information. In the case of a mathematical correlation of the image—of the measured pattern—with the electronic reference pattern, a single sharp correlation peak p' therefore occurs at the rotational angle sought, as shown in FIG. 3C. The rotational angle sought is determined as the rotational angle coordinated with the maximum correlation value.

Figure 2B:
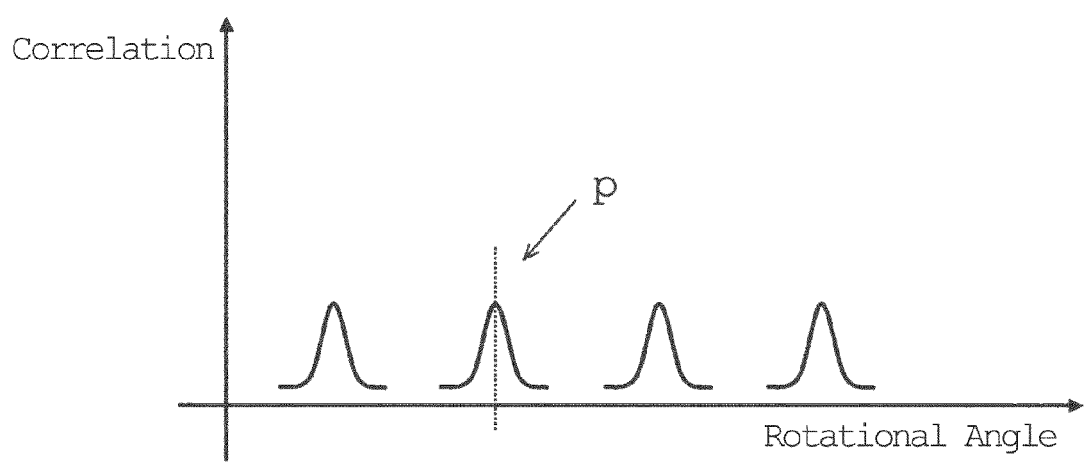

The circular disc 2e in FIG. 3B has a coding over its whole area which is similar to the coding from FIG. 2B. In contrast to FIG. 2B, the point code c4' of the middle code track is however unambiguous, like the point code from FIG. 3A. The absolute code c2' of the outer code track is provided in order to obtain an initial value for forming a correlation of the point code c4' with the reference pattern, which is carried out by means of software. Consequently, the correlation formation is accelerated and the required computational performance is reduced. Thus, an angular value determined from the absolute code c2' can be input as initial value into an angle-dependent function representing the reference pattern and can be varied until the correlation reaches a maximum or a specified correlation value.

Figure 4A:
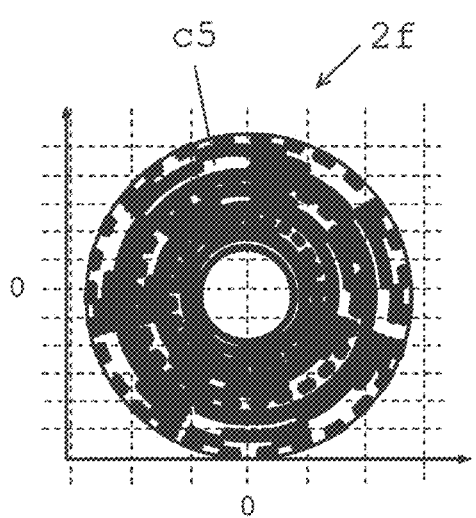
FIG. 4 shows four partial figures for explaining a method according to the invention for determining a rotational angle.

FIG. 4A shows an absolutely coded circular disc 2f of an angle sensor having a binary code c5, applied substantially over the total disc area, in a coordinate system in the 0° angular position. The binary code c5 is formed from transparent and opaque code elements and changes both in the azimuthal and in the radial direction in an angle-dependent manner. The representation of the binary code c5 is purely by way of example. The circular disc 2f is miniaturised. Because the binary code c5 is applied substantially over the whole area, a large number of transitions—and hence coding having a high information content—can nevertheless be realised. Since the circular disc 2f is miniaturised, an—economical—embodiment of an angle sensor comprising a detector whose area corresponds approximately to the area of the circular disc can furthermore be realised.

Figure 4B:
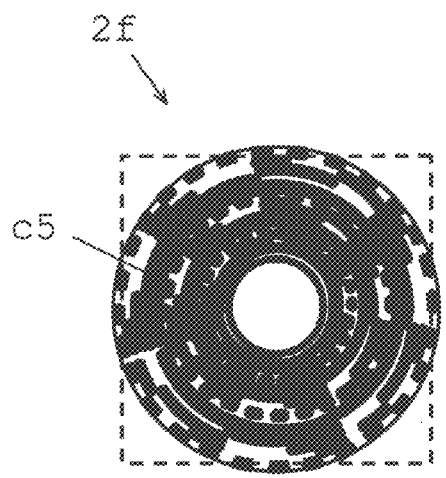

FIG. 4B shows the circular disc 2f after a revolution through about 45°. The position of a planar photosensitive detector of the angle sensor is also shown by dashed lines in FIG. 4B. By forming the circular disc and the detector with approximately the same dimensions, a substantially completely evaluable image of the coding can be produced on the detector. Owing to application onto a miniaturised circular disc 2f, the structures of the coding are also reduced in size and refined. This is taken into account firstly by the coding over the whole area—large number of transitions—which reduces the unsharpness in the position or angle determination. Furthermore, an evaluation method which makes it possible to evaluate the mapped code structures is used for angle determination. Here, the evaluation method comprises the provision of an electronic reference pattern which describes a statistical distribution of a random variable—in this case the rotational angle; the description is based on an estimation function. The measuring function—the image—and the estimation function are compared with one another, the random variable—the rotational angle—being systematically changed. The comparison or the estimation gives a best estimator for the rotational angle.

Figure 4C:
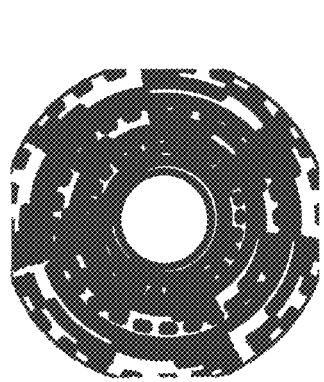
Figure 4D:
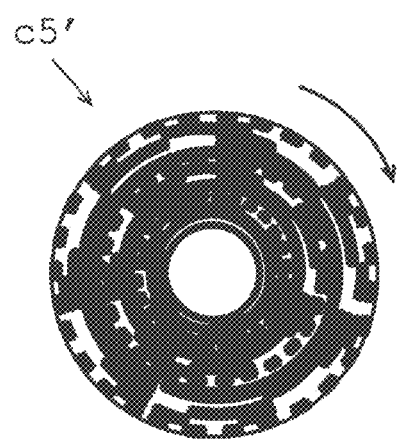

FIGS. 4C and 4D serve—with reference to FIGS. 4A and 4B—for illustrating steps of the method. FIG. 4C represents that region of the binary code c5 which is mapped as an image on the detector. FIG. 4D shows a pictorial representation of a reference pattern which duplicates the binary code c5, which representation serves purely by way of illustration. The reference pattern is shown as a simulation c5' of the binary code c5 at the 0° position—reference position—from FIG. 4A. The actual simulation is effected by means of appropriate software. For evaluation of the image information, a comparison of image and reference pattern and changing of a parameter value of the reference pattern—indicated in the image of FIG. 4D by an arrow as a rotation—until the greatest agreement between image and reference pattern is found are effected. The corresponding parameter value is used for determining the rotational angle value sought.

In FIGS. 5A-5C, in each case a circular disc and a detector having photosensitive detector elements of an angle sensor are shown in partial plan view. In FIG. 5A, the detecting area of the detector 3g, corresponds approximately to the area of the circular disc 2g so that substantially the total coding applied to the circular disc 2g can be mapped in a simple manner onto the detector 3g. The detector 2g is, for example, a 1000×1000 CMOS pixel sensor. The axis of rotation 6' of the angle sensor coincides with the geometrical axes of circular disc 2g and detector 3g-circular disc 2g and detector 3g are arranged so as to be coaxially centred. This is also the case in FIG. 5B. Here, the detector in the form of a CCD area sensor 3h is smaller so that a special illumination concept is required for substantially complete detection of the coding.

5C shows an embodiment comprising a detector 3*i* whose centre does not coincide with the axis of rotation of the angle sensor. The device for image production and the memory and evaluation component of the angle sensor are not shown in any of the embodiments 5A-5C. The device for producing the image is formed and arranged in such a way that as large a region as possible of the coding of the circular disc, in particular the total region of the coding of the circular disc, is mapped onto the detector elements. The image corresponds to electrical measured signals which are compared, for example pixel by pixel, with ideal data derived from a mapping model of the coding or of the image or—as described above—in an alternative manner with an alternative electronic reference pattern.

FIGS. 6A-6D are diagrams of an angle sensor having different devices for producing an evaluable image of the circular disc coding. The formation of the coding can be effected in principle from outside or inside in reflected light or transmitted light, or by a self-illuminating code. Only the illumination from outside is shown.

In FIGS. 6A and 6B, the illumination is effected in transmitted light: the radiation of two photodiodes 10*a* and 10*b* or 10*a*' and 10*b*', respectively, is projected onto the circular disc 2*j* or 2*j*', respectively, and mapped onto the detector 3*j* or 3*j*', respectively, by means of an optical unit shown by way of example here as lens 11 or 11', respectively. In order to achieve as homogeneous an illumination as possible of the circular disc 2*j* or 2*j*', the radiation of the photodiodes 10*a* and 10*b* or 10*a*' and 10*b*', respectively, is diverged, in FIG. 6A by means of a scattering deflecting mirror 12 and in FIG. 6B by a scattering medium 13.

FIGS. 6C and 6D show the illumination of the circular disc in reflected light. The radiation emitted by a radiation source 14 is deflected in FIG. 6C via a beam splitter 14 onto the circular disc 2*k*. The radiation reflected by the circular disc 2*k* passes through the beam splitter 15 via an imaging optical system 16 onto the detector 3*k*. In FIG. 6D, the illumination is effected at an oblique angle of incidence of the light of the radiation source 14' onto the circular disc 2*k*'. The reflected light is again deflected via an imaging optical system 16' onto the detector 3*k*'. The imaging optical system can be formed in each case from lenses having conical and/or spherical and/or aspherical surfaces.

The invention claimed is:

1. An optoelectronic angle sensor for determining a rotational angle about an axis, comprising:
    a circular disc rotatable about the axis and having a coding substantially over the whole area;
    a planar photosensitive detector, the circular disc and the detector being moveable relative to one another;
    a device for producing an evaluable image of the coding on the detector in such a way that the evaluable image comprises information about the relative position of circular disc and detector; and
    a memory and evaluation component for determining the rotational angle, wherein:
        the device produces a substantially complete image of the coding and the memory and evaluation component;
        provides a configured electronic reference pattern which can be coordinated with the coding; and
        determines the rotational angle from said reference pattern and said substantially complete image by means of a parameter-varying stochastic comparison method.

2. An optoelectronic angle sensor according to claim 1, wherein the device:
    produces an entire image of the coding and the memory and evaluation component; and
    provides a configured electronic model-based reference pattern which can be coordinated with the coding.

3. An optoelectronic angle sensor according to claim 1, wherein the substantially complete image has at least 50% of the coding.

4. An optoelectronic angle sensor according to claim 1, wherein the substantially complete image has more than 75% of the coding.

5. An optoelectronic angle sensor according to claim 1, wherein the substantially complete image has 100% of the coding.

6. An optoelectronic angle sensor according to claim 1, wherein the areas of detector and circular disc are adapted to one another in their dimensioning.

7. An optoelectronic angle sensor according to claim 1, wherein the areas of detector and circular disc substantially coincide in their dimensioning.

8. An optoelectronic angle sensor according to any of claim 1, wherein the circular disc and the detector are arranged so as to be coaxially centered.

9. An optoelectronic angle sensor according to claim 1, wherein the reference pattern is configured with a reference rotational angle which describes the rotational position of the reference pattern relative to the substantially complete image.

10. An optoelectronic angle sensor according to claim 1, wherein the reference pattern is based on: a mathematical model of the substantially complete image or of the coding; or a reproducing duplication or simulation of the substantially complete image or of the coding.

11. An optoelectronic angle sensor according to claim 1, wherein the comparison method uses a:
    estimation method; or
    mathematical correlation method.

12. An optoelectronic angle sensor according to claim 1, wherein the comparison method uses a maximum likelihood method or least squares method.

13. An optoelectronic angle sensor according to claim 1, wherein the comparison method has a radial weighting of coding components.

14. An optoelectronic angle sensor according to claim 1, wherein the coding has a:
    code variable in an angle-dependent manner both in the azimuthal and in the radial direction; and/or
    incremental code; and/or
    point code distributed in a polar manner; and/or
    absolute code; and/or
    azimuthally extending radial code,
    as a part-code.

15. A method for determining a rotational angle about an axis, using a circular disc rotatable about the axis and having a coding substantially over the whole area and a planar photosensitive detector the circular disc and the detector being moveable relative to one another, the method comprising:
    producing a substantially complete evaluable image of the coding on the detector in a manner such that the image comprises information about the relative position of circular disc and detector;
    provisioning an electronic reference pattern which can be varied in configuration by at least one parameter and can be coordinated with the coding; and
    deriving the rotational angle by comparison of said reference pattern and said substantially complete evaluable image and by a parameter-varying stochastic comparison method, wherein the method is performed using an optoelectronic angle sensor according to claim 1.

16. The method according to claim 15, wherein an entirely complete evaluable image is produced.

17. The method according to claim 15, wherein the reference pattern is provided: as a mathematical model of the substantially complete evaluable image; as a mathematical model of the coding; as an algorithmic description of the substantially complete evaluable image; as an algorithmic description of the coding; as an image-reproducing simulation or duplication; or as a coding-reproducing simulation or duplication.

18. The method according to claim 15, wherein the reference pattern and the substantially complete evaluable image are digitally superposed in the comparison.

19. The method according to claim 15, wherein an:
- estimation method, in particular maximum likelihood method or least squares method; or
- mathematical correlation method, is used in the derivation.

20. The method according to claim 15, wherein:
- a reference rotational angle which describes the rotational position of the reference pattern relative to a mapping is chosen as the parameter;
- a parameter estimation is carried out by a maximum likelihood method; and the rotational angle is determined as an estimated parameter.

\* \* \* \* \*

UNITED STATES PATENT AND TRADEMARK OFFICE
CERTIFICATE OF CORRECTION

PATENT NO. : 8,462,979 B2
APPLICATION NO. : 12/377445
DATED : June 11, 2013
INVENTOR(S) : Braunecker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1151 days.

Signed and Sealed this
Eighth Day of September, 2015

Michelle K. Lee
*Director of the United States Patent and Trademark Office*